Patented July 21, 1936

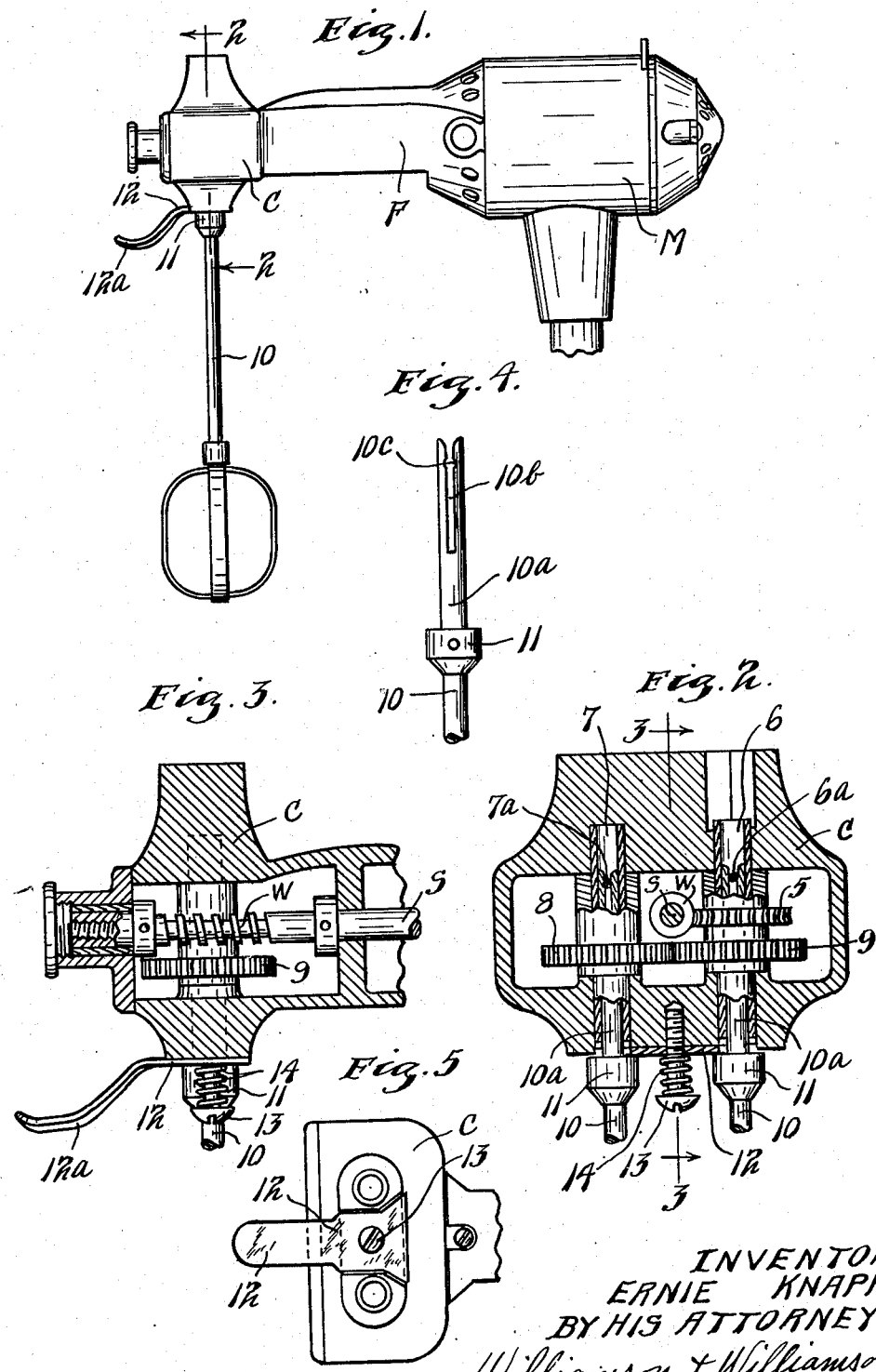

2,048,455

UNITED STATES PATENT OFFICE 2,048,455

FOOD MIXING DEVICE WITH BEATER EJECTOR

Ernie Knapp, Minneapolis, Minn., assignor to Dominion Electrical Mfg. Co., Minneapolis, Minn., a corporation of Minnesota Application December 12, 1934, Serial No. 757,114

1 Claim. (Cl. 259—1)

My invention relates to food mixers and the like and more particularly to improvements thereon whereby the beater elements may be quickly and easily removed for washing or replacement.

In most food mixers now in commercial use, one or two beater elements are utilized and are detachably connected for driving with a frame or case having mounted therein an electrical motor. Difficulty has been encountered in quickly detaching the shanks of the beater element from the sockets or other connection means with which the shanks engage.

It is an object of my invention to provide a very simple but highly efficient mechanism attached to the casing or frame of the device and by which the shanks or driven ends of the beater elements may be longitudinally ejected or removed from the sockets or driving connections of the device.

More specifically, it is my object to provide in a food mixer of the type adapted to drive a pair of beater elements in side by side relationship, efficient means for dislodging or removing both of said beaters by simple manipulation of a single member.

These and other objects and advantages will be more fully set forth in the following description made in connection with the accompanying drawing in which like reference characters refer to similar parts throughout the several views and in which:—

Figure 1 is a side elevation showing the working mechanism and case of an embodiment of my invention with the base or standard broken away and with the beaters operatively attached.

Fig. 2 is a vertical cross-section taken on line 2—2 of Figure 1.

Fig. 3 is a vertical section taken longitudinally of the frame or case of the device on the line 3—3 of Fig. 2 and—

Fig. 4 is a side elevation showing the fragmentary upper portion of one of the beater elements detached.

Fig. 5 is a bottom plan of the outer portion of the frame of the device, including the transmission case, without beaters detached.

In the form of my invention illustrated, the elongated horizontal frame F houses in the rear and enlarged portion thereof an electric motor M of suitable type and power, the armature shaft S, of which is extended outwardly through the medial portion of frame F journalled in suitable bearings and having a worm W provided in the outer portion thereof, which worm engages a worm gear 5 fixed to a beater-driving sleeve 6, which is journalled in vertical position in suitable bearings afforded by the outer portion or transmission case C of the frame F. A second beater-driving sleeve 7 is mounted in parallel relation to driving sleeve 6, the two driving sleeves being arranged transversely of the case C. Driving sleeve 7 has fixed to the medial portion thereof a gear 8 which is in constant mesh with a similar gear 9 fixed to the medial portion of sleeve 6. The sleeves 6 and 7 are thus driven in opposite directions and at the same speed by the shaft S. The lower ends of sleeves 6 and 7 extend through suitable circular apertures formed in the lower portion of case C, in order that the shanks 10a of the beater element may extend into and snugly fit the sockets formed by the interiors of such sleeves.

In the form of food mixer shown, the upper ends of the beater shanks 10a are longitudinally slotted or bifurcated for some distance for driving engagement with diametrically disposed pins 6a and 7a, respectively, fixed in the upper portions of the driving sleeve.

The slotted portions 10b of the beater shank preferably are provided each with an enlargement 10c disposed adjacent the upper end in which driving pins 6a and 7a are seated when the beaters are operatively attached, and the extremities of the bifurcated portion are rounded to form a converging entrance portion to the slot, thereby facilitating an engagement with the driving pins. The material from which beater shanks 10a are constructed is sufficiently resilient to permit adequate spreading of the bifurcated ends for attachment.

The beaters are each provided with an abutment collar 11, disposed just below the shank portion thereof and affording an annular shoulder which is disposed a slight distance below the bottom of case C when the shanks are operatively attached with the seats 10c in engagement with driving pins 6a and 7a.

A flat ejector plate 12 is mounted below the bottom of case C, extending longitudinally of frame F and disposed between the shanks 10a of the cooperating beater elements. Ejector plate 12 is connected to the bottom of case C by a single screw 13 upon the outer end of which is mounted a coil spring 14, which urges plate 12 in contact flush against case C. The working portion of ejector plate 12 is shaped in the manner shown in Figure 5, having a flaring end and being confined against oscillatory movement by a shallow, similarly shaped recess formed in the bottom and depending portion of case C. The longitudinal edges of ejector plate 12 overlie the abutment collars 11 of the beaters, as clearly shown in Figure 2. Ejector plate 12 is provided with a curved, outwardly extending handle 12a, conveniently shaped and disposed for engagement by a human finger for swinging the plate downwardly.

It will be apparent that, assuming the beater elements to be operatively attached in driving sleeves 6 and 7, when ejector plate 12 is swung downwardly a short distance, by manipulation of handle 12a, and against the action of coil spring 14, the shanks of both beaters will be moved longitudinally in a downward direction and the bifurcated ends thereof disengaged from driving pins 6a and 7a, respectively. It is likewise apparent that when only one of the beaters is operatively attached, it will be disengaged at its shank from the driving pin. Subsequent withdrawal of the beater shanks from the sleeves 6 and 7 is very easy after disconnection of the bifurcated shanks with the driving pins by means of the ejector plate.

Prior to my invention, much difficulty has been encountered in disconnecting the driving engagement of the beater elements with the driving elements of the mixer. Such difficulty is entirely overcome by my improved construction, and the additional cost in the manufacture of food mixers is insignificant. My improved mechanism will withstand hard, continued usage, and is attached to the case or frame of the device by means of a single element such as the screw 13, which serves also to mount and retain the compression spring.

It will, of course, be understood that various changes may be made in the form, details and proportions and arrangement of the parts without departing from the scope of my invention, which, generally stated, consists in a device capable of carrying out the objects above set forth, and in the novel parts and combinations of parts disclosed and defined in the appended claim.

What is claimed is:—

In a mixer of the like, the combination of a frame, a driving member mounted in said frame and having an annular portion accessible through said frame, a heating element having a shank longitudinally insertable in said annular portion to effect driving connections therewith, said beating element having an abutment adjacent its shank, an ejector plate mounted on one side of said frame adjacent the abutment of said driving member and having an edge engageable with said abutment, a single member extending through said ejector plate for connecting said plate with said frame, and yieldable means associated with said connection element for urging said ejector plate into retracted position against said frame, said frame having a recessed portion for accommodating said ejector plate to restrain the same against oscillation.

ERNIE KNAPP.